United States Patent

[11] 3,614,047

| [72] | Inventor | Werner Hitze<br>Am Puttenser Felde 2, 3 Hannover,<br>Germany |
|---|---|---|
| [21] | Appl. No. | 793,297 |
| [22] | Filed | Jan. 23, 1969 |
| [45] | Patented | Oct. 19, 1971 |
| [32] | Priority | Feb. 1, 1968 |
| [33] | | Germany |
| [31] | | P 16 73 912.1 |

[54] STAND FOR CAMERAS, MICROPHONES OR THE LIKE
18 Claims, 5 Drawing Figs.

[52] U.S. Cl. .................................................. 248/439,
248/178
[51] Int. Cl. ....................................................F16m 11/38
[50] Field of Search.......................................... 248/439,
168, 166, 436, 178, 179, 186, 187, 467, 181

[56] References Cited
UNITED STATES PATENTS

| 1,559,716 | 11/1925 | Lingle et al. | 248/186 |
| 2,563,410 | 8/1951 | Micek | 248/166 |
| 3,094,802 | 6/1963 | Perry | 248/168 |
| 3,483,999 | 12/1969 | Barrett | 248/168 |
| 230,935 | 8/1880 | Githens | 248/168 |
| 1,934,223 | 11/1933 | Booth | 248/181 |
| 3,168,276 | 2/1965 | Schneider | 248/467 |
| 3,305,202 | 2/1967 | Christenson | 248/467 |

FOREIGN PATENTS

| 1,052,360 | 12/1966 | Great Britain | 248/168 |

*Primary Examiner*—Edward C. Allen
*Attorney*—Smyth, Roston & Pavitt

ABSTRACT: A stand for mounting objects such as cameras or the like is disclosed in which a base element has two pairs of legs which are mounted at opposite sides of the base element for pivoting the legs of a pair in unison, as well as individually, and for folding them under the base plate. An auxiliary support for the object holder proper is mounted on the base element for angular and radial adjustment (in a horizontal plane) of the center of gravity.

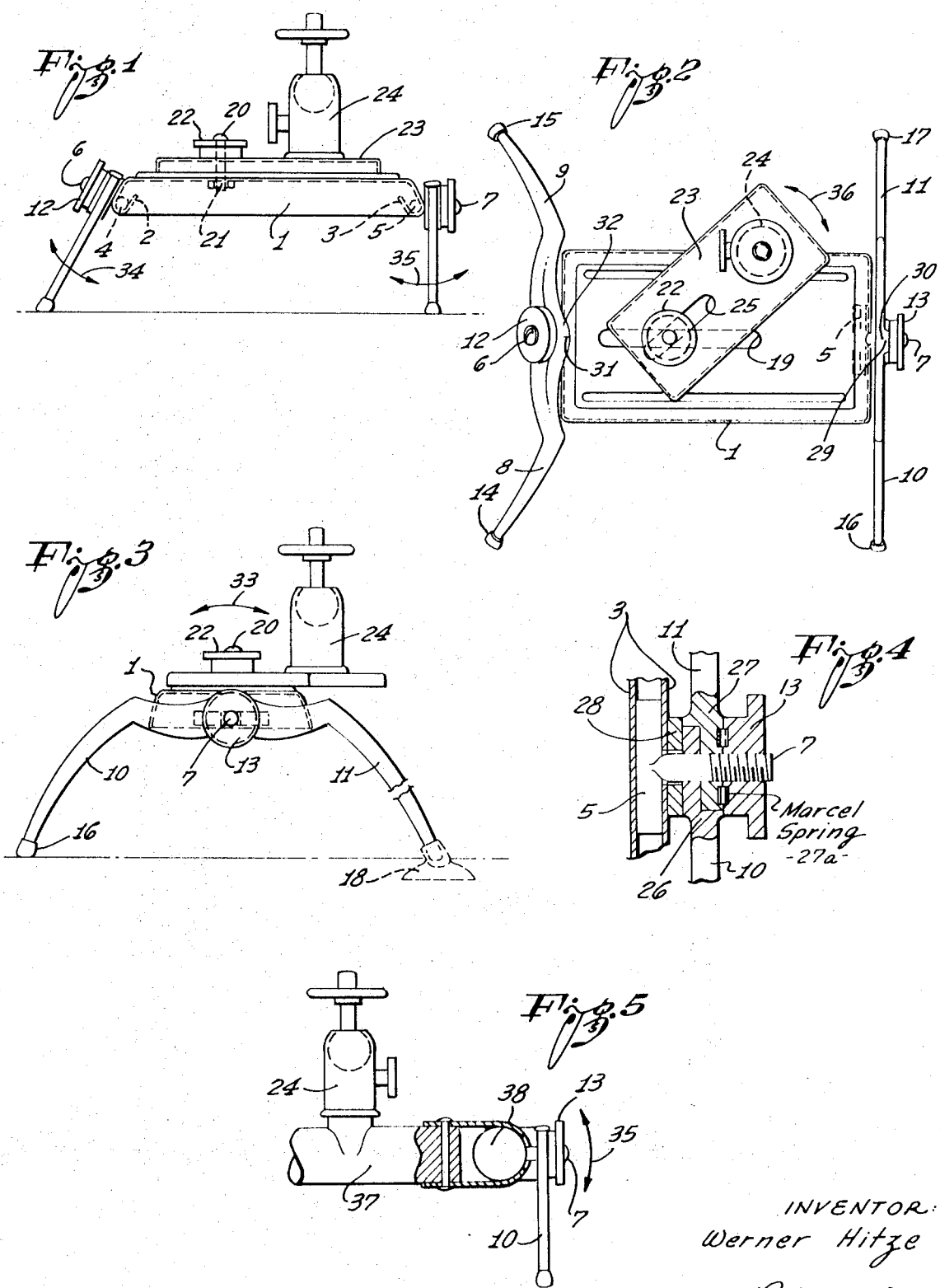

STAND FOR CAMERAS, MICROPHONES OR THE LIKE

The invention relates to a stand for a camera, microphones, or the like, with a baseplate to which the part or device to be positioned can be mounted and which baseplate is provided with pairs of pivotable legs.

Cameras, microphones, or the like, are usually set up by mounting them on a tripod having essentially three telescopic legs. In order to collapse the tripod to a small size, the legs have to be provided with many telescopic elements which is detrimental to its stability. If, for reasons of stability, fewer telescopic parts per leg are selected, the tripod is still rather long and bulky in the collapsed position. Such a tripod becomes an impediment for transportation and there are situations in which such tripod is still not necessarily a very secure and safe support. For example, in case of an uneven surface on which the tripod is to be placed, the tripod may actually not be usable because each leg must extend fully or in units of length of each telescopic element. This does not provide sufficient adaptation range for positioning on an uneven surface. Furthermore, such tripods are rather expensive and are easily damaged, for example, if a telescoping leg is bent even slightly.

Aside from these tripods so-called combination or multipurpose stands are known consisting of many different parts which, in accordance with various conditions can be combined such that the object to be positioned is always firmly positioned, particularly as far as location of its center of gravity is concerned and without danger of shaking. Supporting devices of this type, however, are very expensive and, of course, they are rather cumbersome and complicated in their use.

Another type of camera support is known which a person carries himself during use. Of course, such a support moves with the person and is unsuitable for self-exposure. Clamping-type supports are known; however, they have only limited use as there is not always a suitable object to which the support can be clamped, particularly because more often than not, such clamping damages the object onto which the support is clamped.

In order to eliminate the various disadvantages outlined above, a very inexpensive and practical stand for photographic or movie cameras such as regular 8 mm. or super 8 mm. or 16 mm. cameras is known, which includes a bowl, open towards the bottom and having four support legs which can be folded back into the interior of the bowl for storage. The back of the bowl is provided with suitable grooves, notches, or the like, for securing a ball and socket joint serving as support proper for a photographic camera or the like. A stand of this type is of considerable advantage over the other stands and supports, etc., discussed above. However, the position of the legs can be matched to an uneven surface only to a very limited degree. Each of the legs is individually mounted pivotally to the bowl. Therefore, they have to be adjusted individually for matching the stand to an uneven surface. Adjustment can be obtained by pressing the entire stand down onto the surfaces onto which it is being placed. However, it was found that the range of adaptability and adjustability is still rather small because the legs can be pivoted in one direction only by such downwardly directed pressure; reverse pivoting of any leg in down direction is not possible by such downwardly directed urging operation.

It is an object of the present invention to obviate the disadvantages of the various known stands and to particularly obviate the limitations these stands have as to adaptability to an uneven surface, so that a simple urging of the stand toward and onto the surface upon which it is placed does, in fact, permit safe positioning the object for which the stand serves as support.

In accordance with the present invention it is suggested to pivotally mount pairs of legs to a base, pivoting of the legs of each pair being possible about a common axis. Such construction permits high adaptability to a very uneven surface because legs coact in pairs by pivoting about the axis so that one leg lifts while the other lowers by the pivoting about the axis. This occurs particularly in case the stand is urged toward an uneven support surface. One leg of a pair will encounter resistance from the surface first and is relatively pivoted up upon continued down pressure so that the other leg is forced to pivot down until resting on a lower positioned surface portion. This permits adaptability to large unevennesses which can be compensated by degrees of pivoting and simply by continuing to urge the stand toward the ground until all legs find ground support.

The known stands with four separate legs do not permit that any of the legs could be moved toward a lower ground surface portion by operation of urging the stand down as a whole toward ground. From a different point of view, provision of a common axis for pivoting a pair of legs means that the plate itself can be regarded as being pivotable about an axis which is common to a pair of legs and in any position the legs may have, so that the base plate upon which, for example, is mounted a camera, can in total be swiveled to assume horizontal or any other position.

In furtherance of the invention, the legs of a pair may, in addition, be folded together, i.e., pivoted individually toward each other and/or the legs can be provided with a stop limiting undue spreading of the legs. Also, it is of advantage to couple the two legs of a pair frictionally to each other such that upon pivoting of one leg, the other leg does normally follow the motion in the same direction of turning. This common pivoting could result from coupling the legs together rigidly. It is better, however, to permit also pivoting of the legs of a pair relative to each other so that the height of the baseplate above any point of engagement of a leg with the ground is adjustable. To state it differently, the height of the common pivot axis for the legs of a pair of above ground is adjustable by operation of construction permitting spreading of the legs relative to each other or folding them together. Foldability is of advantage for packing the stand into a bag, particularly if the pivot axis itself can be rotated around a folding axis transverse to the pivot axis; the folding axis being essentially in the plane of the baseplate. It follows, therefore, that each leg is pivotable about two axes and can, therefore, be folded completely under the baseplate, so that the entire support, when folded, has only size and dimension of the baseplate.

The pin for pivotably supporting a pair of legs can be mounted on universal joint such as a ball and socket joint or the like. This way the pair of legs can be turned additionally about a vertical axis in order, for example, to find standing positions more suitable than others. It follows, therefore, that the range of adjustment is finally limited only by the length of the legs themselves.

Preferably, the legs are bent; rubber feet and/or suction cups are placed on the leg ends, particularly to prevent that after placing the stand on a ground surface the legs of a pair do not change relative positions to each other, they must not spread or fold up. In addition, it should be observed that in view of the large variety for positioning the baseplate it may appear that the center of gravity of the object to be positioned by the stand appears in a very different location in relation to the legs, particularly in relation to the points of engagement thereof with ground. There is then the danger that the center of gravity of the object is too close to one or several of these support points or even tends to overhang so that the entire arrangement topples over. For this reason it is of advantage to place a directionally adjustable, auxiliary plate on the baseplate, which can even be disposed to laterally project beyond the baseplate and upon which is mounted the support proper or holder for supporting the object for which the device in question serves as a stand. This auxiliary plate, therefore, permits adjustment of the relative position of the object to be positioned in relation to the four points of engagement of the lower leg ends with the ground so that the center of gravity remains as much as possible in central position in relation to the legs.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a side elevation of a stand in accordance with the preferred embodiment of the present invention;

FIG. 2 illustrates a top elevation of the stand shown in FIG. 1;

FIG. 3 shows the front elevation of the stand shown in FIGS. 1 and 2;

FIG. 4 is a cross-sectional view showing details in the stand shown in FIGS. 1, 2 and 3, particularly concerning the support for one of the pairs of legs thereof; and FIG. 5 illustrates a modification of the stand shown in FIGS. 1 through 4.

Proceeding now to the detailed description of the drawings, in FIGS. 1 through 4 there is illustrated a stand comprised of a baseplate 1 having straps 2 and 3 of J-shaped cross section serving as bearings for supporting spindles 4 and 5 respectively. The straps have apertures and pins 6 and 7 extending from and perpendicularly to spindles 4 and 5 respectively traverse these apertures. Pins 6 and 7 each can extend in different directions and in radial planes of spindles 4 and 5 respectively. Support legs 8 and 9 are pivotally mounted on pin 6, and, analogously, support legs 10 and 11 are pivotally mounted on pin 7. A knurled nut 12 tightens legs 8 and 9 to pin 6 and a knurled nut 13 tightens legs 10 and 11 to pin 7.

The legs are tightening in that they frictionally engage mutually and bear frictionally against respective edges of the baseplate 1. The frictional coupling between the legs is somewhat stronger than the frictional engagement with the baseplate 1 so that upon placing the legs on ground, the legs of each pair of legs are pivoted in unison to match the supporting surface. Independently from this placement and by appropriate adjustment the legs of each pair are pivoted relative to each other.

FIG. 4 illustrates in a sectional view somewhat enlarged portion of spindle 5 with attached pin 7 upon which is screwed knurled nut 13. As one can see from this detailed illustration, legs 10 and 11 have flat disk-shaped terminal parts 25 and 27 respectively placed on top of each other; the disk-shaped part 26 bears additionally against a washer 28 which, in turn, bears against the outside of strap 3 in operating position. A spring 27a is provided in indexing grooves, respectively in disk 27 and knob 13, for providing constant and permanently effective frictional pressure as between elements 26 and 27 on the one hand, and disk 26, washer 28 and element 3, on the other hand.

As nut 13 is released, legs 10 and 11 can easily be pivoted relative to each other. As nut 13 is tightened to some extent, frictional engagement between elements 26 and 27 is sufficiently strong so that the legs 10 and 11 pivot in unison if force is applied to one of the legs only to pivot the pair around the axis of pin 7, thereby overcoming frictional engagement with washer 28. Upon strongly tightening nut 13, the friction between all elements on shaft 7 can be increased such that the position of the legs relative to the baseplate 1 is firmly arrested. Nut or knob 13 (and 12) will be tightened after the stand has been appropriately positioned with the feet of all four legs resting firmly on ground. The disk-shaped parts 26 and 27, as shown in FIG. 4, are provided in addition with stops 29 and 30 in order to limit spreading of legs 10 and 11. Stops 31 and 32 correspondingly limit spreading of legs 8 and 9.

Rubber feet 14 through 17 are respectively attached to the ends of the legs 8 through 11 in order to prevent lateral sliding or undesired folding, for example, of the legs of a pair relative to each other. FIG. 3 illustrates in addition, that for example, one, several or all rubber feet can be substituted by suction cups such as 18 in order to provide strong adherence to a lateral or even overhung surface provided such surface is sufficiently smooth. If such suction cups are provided the stand may be made to adhere even to sidewalls, windows, furniture or even the ceiling. Of course, with suction cups there is always the danger that they are released after some time. However, if the surface to which the suction cups are attached is sufficiently smooth, the suction will persist, for example, for the duration of taking a picture, if the camera is the object to be positioned.

Another advantageous aspect of the stand in accordance with the principle of the invention is obtained by having the legs 8 through 10 constructed so that they appear to be bent in about the middle. The legs may be articulated to vary the bending angle. A bent leg, particularly when variably bendable increases adaptability for the stand when placed on a very uneven ground surface.

The baseplate 1 is provided with a longitudinal slot 19 through which projects a bolt 20, the head 21 of which bears against baseplate 1 from below while a knurled nut 22 is screwed onto bolt 20 from above in order to urge an auxiliary plate 23 against the surface of baseplate 1. Plate 23 carries a holder 24 of known construction. Element 24 includes a universal joint with a head for attaching a camera or the like. The support element 24 is eccentrical to the vertical axis as defined by bolt 20.

The auxiliary plate 23 has several degrees of freedom as to its relative position. After release of nut 22, bolt 20 can be shifted in longitudinal slot 19 and plate 23 can be rotated about bolt 20. In addition, plate 23 itself has a longitudinal slot 25 traversed by bolt 20 so that the plate can be shifted in the direction of extension of slot 25 which direction depends upon the angular adjustment position of plate 23 in relation to the extension of direction of the slot 19.

It can thus be seen that the center of gravity, for example, of a camera mounted on the holder 24 can be displaced and positioned in relation to the particular position of the legs 8 through 11 such that a sufficiently secure and firm standing position is obtained.

The legs 8 through 11 in the stand as illustrated and described can be adjusted to different positions as follows. First of all, the legs are mounted to be pivotable in pairs and respectively about pins 6 and 7 relative to baseplate 1, or one can say that the baseplate is positioned on the legs for pivot motion about pins 6 or 7 or both; arrow 33 in FIG. 3 represents this adjustment Furthermore, the legs of each pair, for example, legs 8 and 9 forming one pair and legs 10 and 11 forming another pair, are pivotable relative to each other, which means that the legs of a pair can be spread apart completely or partially as stops 29 to 32 permit, or they can be folded together. Spreading or folding of the legs of a pair to a variable degree permits adjustment of the height of baseplate above the ground on which the feet of the legs rest. Also, the distance between the points of engagement of the feet of the legs of a pair with the ground can be adjusted by variable spreading.

Next, the legs are pivotable in pairs about spindles 4 and 5, for folding the legs. Double arrows 34 and 35 show the adjustment possibilities as resulting from turning the several legs on the spindles in the respective straps 2 and 3. Pivoting adjustment about spindles 4 and 5 permit a further adjustment of the height of baseplate 1 above ground together with adjustment of the distance of the legs of different pairs from each other. Furthermore, the legs can be folded under the baseplate for purposes of shipping by pivoting them in pairs about spindles 4 and 5 respectively.

It follows that upon initial release of nuts 12 and 13 or by tightening them lightly, each of the legs is individually adjustable as to pivot position definable by two transverse pivot axes (pins 6 and 7) and within the range of adjustment the distance of the lower ends or feet of the legs of each pair from each other is adjustable accordingly. On the other hand, after some tightening of nuts 12 and 13, and upon pressing the stand down as a whole, each pair of legs individually can pivot (about shaft 6 or 7) and such pivoting will occur if the ground is uneven, whereby one leg, when engaging ground first provides reaction, and continued downward urging of the stand as a whole pivots that leg pair particularly by pivoting the other leg of the pair down until finding resistance. This position finding occurs independently for each leg pair. Subsequently, it may be necessary in cases to turn one of the pairs of legs about spindle 4 or 5 if the left side (in FIGS. 1 or 2) of base plate 1 is higher or lower than the right side. Complete tightening of nuts 12 and 13 finally arrests the stand in proper position.

Finally, auxiliary plate 23 is pivotable about the axis of bolt 20 as representatively shown by double arrow 36 and, of course, longitudinal adjustments in slots 19 and 25 permit lateral adjustment of auxiliary plate 33 relative to base plate 1 over a range given by the respective lengths of the slots and in any direction in the plane of extension of base plate 1 as positioned. The slots 19 and 25 are sufficiently long to establish an adjusting range for appropriately positioning the center of gravity of the object positioned on holder 24 and for whose support the stand is provided. Particularly, the center of gravity of that object may have come too close or even overhang one of the four base lines defined by neighboring leg ends where engaging ground. This may well be unforeseeable as the points where the leg ends rest finally are "known" only after the stand has been positioned as described, requiring repositioning of holder 24 by using slots 19 and 25 for adjustment permits centering the object on holder 24.

A modified version of the invention is shown in FIG. 5. Parts which are similar to corresponding parts in the embodiment of FIGS. 1 through 4 are shown with the same reference numbers. This includes particularly elements 7, 10 and 13. A first distinctive feature of FIG. 5 is that a round bar 37 is substituted for the base plate as well as for the auxiliary plate 23. The round bar 37 carries holder 24 in a fixed, preferably central position. A universal joint such as a ball and socket joint 38 is provided on one end of bar 37. In this embodiment joint 38 provides the function of spindle 5 in the embodiment of FIGS. 1 through 4. The ball and socket joint 38 carries the pin 7 to which are bolted, for example, the legs 10 and 11, as heretofore described.

An advantage of this construction is that not only can the legs of a pair be pivoted about an axis such as was defined by spindle 5 in FIGS. 1 through 4, but the joint 38 permits additional angular displacement about a vertical axis so that a line through the feet of legs 10 and 11 can obtain an oblique position relative to a line through the feet of legs 8 and 9. The other end of rod 37 may be provided with a similar ball and socket joint for attachment of pin 6 on which are mounted the other legs 8 and 9 in an analogous manner. Alternatively the legs 8 and 9 may be connected to the other end of bar 37 as before.

The invention is not limited to the embodiments described above, but all changes and modifications thereof not constituting departures from the spirit and scope of the invention are intended to be included.

I claim:

1. A stand for mounting objects such as photographic cameras, microphones, or the like, comprising:
    a base element including means for mounting an object thereto;
    a first pair of legs, and a second pair of legs;
    first means for pivotally mounting the legs of the first pair on one side of the base element, for pivoting about first and second transverse and coplanar axes;
    second means for pivotally mounting the legs of the second pair on an opposite side of the base element, for pivoting about third and fourth coplanar and transverse axes; and
    releasable friction means on the first and third axes for individually and frictionally maintaining adjusted pivot positions of the first and second pair of legs on said axes, upon tightening of the friction means.

2. The stand as set forth in claim 1, the legs of each of the pairs respectively pivotally mounted relative to each other about the first and third axis.

3. The stand as set forth in claim 2, there being stop means for limiting the range of relative spreading of the legs of a pair of the pairs.

4. The stand as set forth in claim 1, the legs of each pair mounted for pivoting in unison about the respective one of the first and third axis, so that upon pivoting of a pair of the pairs the lower end of one leg of the pair moves up, while the lower end of the other leg of the pair moves down.

5. The stand as set forth in claim 4, the legs of each pair of the pairs being frictionally coupled to each other by the friction means, for pivoting in unison respectively about the first and third axes upon partial tightening of the friction means and for pivoting relative to each other about these axes upon release of the friction means.

6. The stand as set forth in claim 1, the means for mounting including first and second pins respectively defining the first and third axes and mounted to the base element, said releasable friction means retaining the first and second pairs of legs respectively on the pins for frictional engagement with the base element.

7. The stand as in claim 6, the releasable friction means including means on the pins for frictionally tightening the respective legs of each paid together, and for tightening them in unison against the base element.

8. The stand as set forth in claim 6, the legs of each of the pairs being individually pivotally mounted on the first and second pins and frictionally engaging each other.

9. The stand as set forth in claim 6, the first and second pins being pivotally mounted to the base element respectively for pivoting about the second and fourth parallel axes, said axes being parallel.

10. The stand as set forth in claim 9, the first and second pins respectively mounted on journaled first and second spindles extending in parallel and in the plane of predominant extension of the base element.

11. The stand as in claim 10, there being straps on the base element defining the journals for the first and second spindle, the friction means for tightening the legs of each pair together, and respectively against the respective straps from one side for tightening the journal at the respective other side, thereby frictionally maintaining the angular position of the spindles in the straps, and the angular position of the legs on the pins.

12. The stand as set forth in claim 6, at least one of the pins mounted to the base element by means of a universal joint.

13. The stand as set forth in claim 1, the legs each being inwardly bent in about the middle.

14. The stand as set forth in claim 1, the legs provided at their respective lower end with slippage-proofing means.

15. The stand as set forth in claim 14, the slippage-proofing means being rubber feet.

16. The stand as set forth in claim 14, the slippage-proofing means including suction cups.

17. The stand as set forth in claim 1, the means for mounting including an auxiliary plate mounted on the base element for angular adjustment about a center and for radial displacement of that center, and a holder on the auxiliary plate.

18. The stand as in claim 17, the base element and the auxiliary plate each having a slot, and fastening means traversing both slots for tightening the auxiliary plate to the base element at variable relative lateral and angular disposition as determined by relative, selectable orientation of the slots.